United States Patent

[11] 3,589,341

| [72] | Inventor | Jacob Krebs<br>Philadelphia, Pa. |
|---|---|---|
| [21] | Appl. No. | 860,679 |
| [22] | Filed | Sept. 24, 1969 |
| [45] | Patented | June 29, 1971 |

[54] ANIMAL COLLAR WITH MAGNETIC FASTENER
8 Claims, 8 Drawing Figs.

[52] U.S. Cl. .................................................... 119/106,
24/201, 119/109
[51] Int. Cl. .................................................. A01k 27/00
[50] Field of Search ......................................... 119/106,
109; 24/201

[56] References Cited
UNITED STATES PATENTS

| 2,612,139 | 9/1952 | Collins | 119/106 |
| 3,086,268 | 4/1963 | Chaffin, Jr. | 24/201 |

Primary Examiner—Aldrich F. Medbery
Attorney—B. P. Fishburne, Jr.

ABSTRACT: An animal collar particularly adaptable to cats has a permanent magnet fastener which is smooth and free of projections when coupled. The fastener embodies interfitting sections which are easy to engage and separate by a simple pushing and pulling operations. Conventional buckle hardware is completely eliminated. The collar will open under a predetermined load in the event that the animal becomes hung or caught on a tree, fence post, or the like.

PATENTED JUN 29 1971  3,589,341
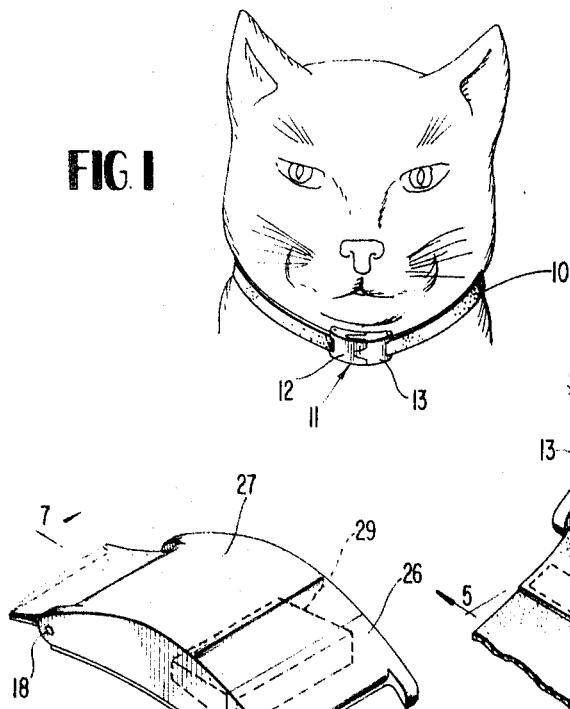
FIG. I
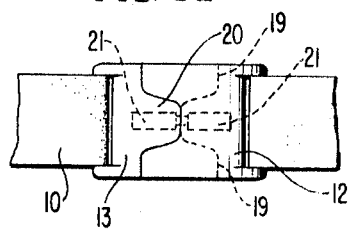
FIG. 5a
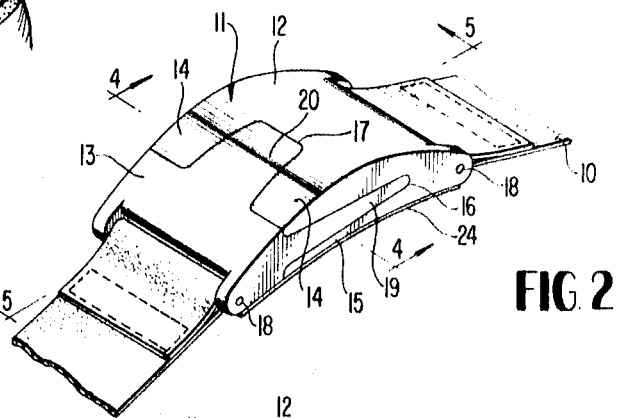
FIG. 2
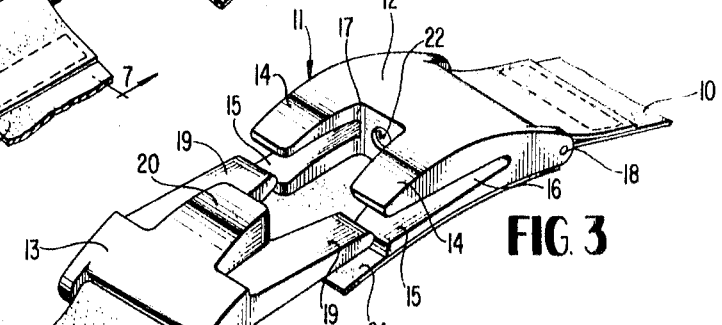
FIG. 3
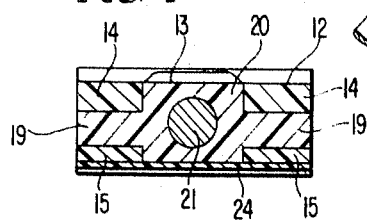
FIG. 6
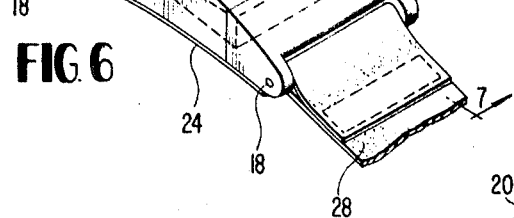
FIG. 4
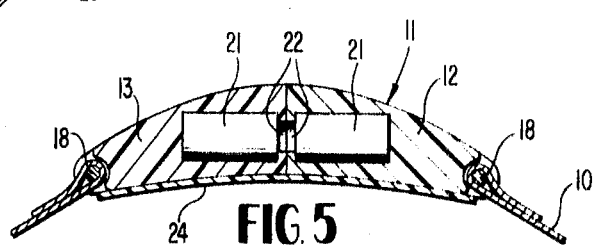
FIG. 5
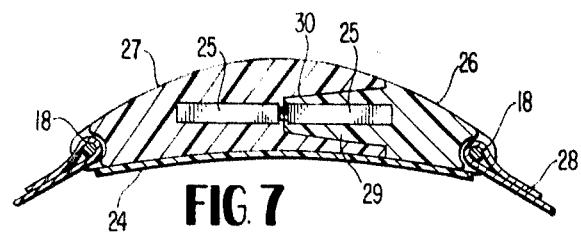
FIG. 7
INVENTOR
JACOB KREBS
BY B.P. Fishleer Jr.
ATTORNEY

ANIMAL COLLAR WITH MAGNETIC FASTENER

The objective of the invention is to provide an animal collar which is safer than conventional buckle collars, easier to open and close by a simple pushing and pulling engagement and disengagement, and economical to manufacture. The collar also has eye appeal and the fastener, which constitutes the essence of the invention, when coupled is secure and smooth surfaced to greatly minimize the likelihood of the animal having the collar catch on some projecting object.

Other features and advantages of the invention will be apparent during the course of the following description.

BRIEF DESCRIPTION OF DRAWING FIGURES

FIG. 1 is a perspective view of an animal collar and fastener embodying the invention.

FIG. 2 is an enlarged fragmentary perspective view of the fastener closed or engaged.

FIG. 3 is a similar view of the two fastener sections separated.

FIG. 4 is a transverse vertical section on line 4-4 of FIG. 2.

FIG. 5 is a longitudinal vertical section on line 5-5 of FIG. 2.

FIG. 5a is a plan view of the structure as shown in FIG. 2.

FIG. 6 is a perspective view of a modification.

FIG. 7 is a longitudinal vertical section taken on line 7-7 of FIG. 6.

DETAILED DESCRIPTION OF PREFERRED EMBODIMENTS

Referring to the drawings in detail, wherein like numerals designate like parts, the numeral 10 designates a collar body portion preferably in the form of a relatively thin band of woven silk, nylon or like material. Other materials may be employed, if preferred, including plastics, leather or the like.

The collar fastener indicated in its entirety at 11 is formed in two mating sections 12 and 13 which are engaged and separated by a simple longitudinal push-and-pull operation. No buckles, snaps, loops or other mechanical devices, difficult to manipulate with the fingers, are involved. The fastener sections are very well adapted to be molded from plastic but could, if preferred, be made of aluminum, brass or other like materials.

The fastener section 12, which is the female section, has pairs of projecting fingers 14 and 15 on its upper and lower sides having formed therebetween shallow elongated slots 16 to receive tongues on the mating fastener section, to be described. Between the pairs of fingers 14 and 15 is a relatively deep tapering recess 17 formed entirely through the fastener section 12 from top to bottom and extending from the tips of the fingers to a point about midway of the length of the fastener section. One end of the strap 10 is secured to a transverse pin element 18 at the rear end of the fastener section 12.

The mating section 13 has relatively thin elongated tapered longitudinal tongues 19 on its opposite sides which fit snugly into the slots 16, which are also tapered. Between the tongues 19 is a thick longitudinally tapered lug 20 which projects both above and below the tongues 19, FIG. 4, and also fits snugly into the tapered recess 17 of the fastener section 12. The tapered formation of the tongues 19 and lug 20 in two right angular planes renders the engaging or closing of the fastener very simple when the two sections are placed together longitudinally. As soon as the tongues 19 enter the slots 16 and the lug 20 enters the recess 17, the parts will guide or pilot themselves smoothly into engagement. The entire fastener is thin or shallow in the direction radially of the animal's neck and the outer surface is smoothly rounded and free of projections while the interior surface is relatively flat, yet slightly rounded, as shown in FIG. 5.

The two fastener sections 12 and 13 are held closed by a pair of small opposed cylindrical permanent magnets 21, such as Alnico magnets, which are polarized so that their opposing ends will attract. These magnets 21 are cast or molded into the fastener sections 12 and 13, as shown. Small openings 22 are provided at the rear of the recess 17 and the front of the lug 20, FIG. 5, in alignment with the ends of the magnets and partially exposing said ends. The magnets 21 are snugly held in the fastener sections and do not move and cannot become separated. When the two fastener sections 12 and 13 are pushed together in full engagement, FIGS. 2 and 5, the opposing ends of the magnets 21 are closely spaced and the magnetic attraction between them is at the greatest at this time, since magnetic attraction is inversely proportional to the square of the distance between unlike magnetic poles. Thus, the two magnets will secure the coupled fastener sections 12 and 13 firmly but will allow them to separate under a predetermined load or pull, preferably in the range of one-quarter to one-half pound. Such an arrangement will allow the collar fastener to open should the cat become hung up on a fence, tree or the like, so that the animal will not choke. At the same time, the fastener will be securely closed and will not open under normal loading. The fastener is very easy to close and separate by hand due to the complete absence of loops and pins and collar strap openings commonly found in buckle collars. The device is extremely neat and attractive in its design and highly compact with no moving parts except the two sections 12 and 13. When the two sections 12 and 13 are fully engaged, FIGS. 2 and 5, the lug 20 and the tongues 19 bottom in or completely fill up the recess 17 and slots 16, respectively, so that in effect the fastener 11 then becomes a completely solid structure.

The opposite end of the band or strap 10 is secured conventionally to a transverse pin element 23 on the fastener section 13.

FIGS. 3 and 5 also clearly show a further feature of the invention which resides in the provision of a thin pad 24 formed of neoprene or the like whose purpose is to prevent the animal's hair from being caught between the two fastener parts. This pad, which is an optional feature, may be cemented to the bottom face of the fastener section 12, as shown, and will underlie both fastener sections when the fastener is coupled or closed, FIG. 5, thus preventing hair from entering between the opposing faces of the two sections.

FIGS. 6 and 7 show a slight modification of the invention wherein a pair of thin rectangular platelike magnets 25 are employed instead of the cylindrical magnets 21. The magnets 25 are embedded within two fastener sections 26 and 27, as shown, whose outer ends are connected with a strap 28 which may be identical to the previously described strap or collar 10 utilizing the identical pins 18. The modified fastener may also employ the neoprene pad 24, previously described, for the same purpose.

The fastener section 26 has a somewhat reduced thickness and width tongue 29 which is tapered on its top and bottom faces and opposite sides for ease of entry into a recess or socket of like tapered configuration shown at 30 in the fastener section 27 and opening through its leading end. Two magnets 25 are molded into the section 27 at the bottom of the recess 30 and into the tongue 29, as best shown in FIG. 7. Thus, when the two fastener sections are pushed into full engagement, the opposing magnets will exert an attractive holding force in substantially the identical manner described in the previous embodiment. In both cases, when the fastener is closed, the parts are substantially locked against movement both laterally and in the direction radially of the animal's neck by the mechanical engagement of parts. The sections will only separate longitudinally under a specified pull or force which can be designed into the fastener to meet particular needs. The closed fastener becomes substantially a solid body which is very stable. In both forms of the invention, the closed fastener is thin and compact in the radial direction and smoothly rounded and characterized by the complete absence of rough projections. It tapers toward its opposite ends which are connected with the strap 10 and it is only slightly wider than the width of the strap.

It is believed that the features and advantages of the invention will now be readily understood, without the necessity for any further description herein.

It is to be understood that the forms of the invention herewith shown and described are to be taken as preferred examples of the same, and that various changes in the shape, size and arrangement of parts may be resorted to, without departing from the spirit of the invention.

I claim:

1. A fastener for an animal collar or the like comprising a pair of interfitting fastener sections, one fastener section having a pair of longitudinally projecting tapering tongues and a longitudinally shorter and relatively thicker lug which extends above and below the tongues for substantially the full thickness of such section, said lug tapering in a plane at right angles to the plane of taper of said tongues, said tongues disposed on opposite sides of said lug, the second of said fastener sections having side tapering slots receiving said tongues and having a tapering recess centrally between the slots extending entirely therethrough from top to bottom and receiving said lug, said second section having elongated fingers defined by the slots which engage above and below the tongues, whereby the two fastener sections when moved longitudinally into engagement are mechanically locked against movement in every direction except the direction which will separate them longitudinally, and permanent magnets on the fastener sections in opposing attractive relationship to firmly secure the two sections in engaged relationship.

2. The structure of claim 1, and a relatively thin pad secured to the bottom face of one fastener section and projecting under the bottom face of the other fastener section when the two sections are coupled to prevent hair or the like from entering between the opposing faces of the two fastener sections.

3. The structure of claim 1, and said permanent magnets are a pair of small pinlike magnets embedded centrally in the two fastener sections in axial alignment with their opposing tips disposed near the base of said recess and the tip of said lug, respectively.

4. The structure of claim 1, and a flexible strap element forming the body portion of a collar having its opposite ends secured one each to said fastener sections.

5. The structure of claim 1, and each fastener section being smoothly rounded on its outer and interior use surfaces and each fastener section tapering toward its outer end and being free of external projections.

6. The structure of claim 1, and said fastener sections molded from plastic and having said permanent magnets molded therein and substantially fully enclosed.

7. A fastener for an animal collar or the like comprising an interfitting pair of smooth surfaced projection-free fastener sections adapted to have corresponding ends secured to a flexible collar body portion, one fastener section having a socket recess in its leading end tapering in two directions and the other fastener section having a complementally tapered tongue for entry into said recess and substantially filling the recess so that the two sections are mechanically interlocked against relative movement, and a pair of opposing permanent magnets embedded in the two sections with opposing attractive poles in close proximity when said tongue is fully seated within said recess and thereby holding said sections of the fastener engaged until a specified tension force is applied thereto to separate them.

8. The structure of claim 7, and said magnets are thin platelike permanent magnets with one magnet embedded in said tongue and the other magnet embedded in the opposing fastener section adjacent the bottom of said recess.